United States Patent [19]

Webb

[11] 4,335,175
[45] Jun. 15, 1982

[54] THERMOPLASTIC FILM LAMINATES

[75] Inventor: James L. Webb, Simpsonville, S.C.

[73] Assignee: W. R. Grace & Co., Duncan, S.C.

[21] Appl. No.: 193,245

[22] Filed: Oct. 1, 1980

[51] Int. Cl.$^3$ .................. B32B 27/08; B32B 27/18
[52] U.S. Cl. .................................. 428/213; 428/516; 428/520; 428/476.1; 229/87 R; 264/176 R
[58] Field of Search ............ 428/516, 520, 213, 476.1

[56] References Cited

U.S. PATENT DOCUMENTS

| | | | |
|---|---|---|---|
| 3,496,061 | 2/1970 | Freshour et al. | 428/516 X |
| 3,547,754 | 12/1970 | Tokos et al. | 428/516 X |
| 4,132,857 | 1/1979 | Scarola et al. | 428/516 X |
| 4,257,536 | 3/1981 | Hilmar | 428/516 X |

*Primary Examiner*—P. Ives
*Attorney, Agent, or Firm*—John J. Toney; William D. Lee, Jr.

[57] ABSTRACT

A coextruded film laminate having an ethylene-vinyl acetate copolymer/ethylene-acrylic acid copolymer/ionomer layer structure has superior delamination resistance and can preferably serve as a sealant structure in a composite laminate but can also serve as a substrate or covering web for many packaging applications, particularly for forming packages for foodstuffs.

4 Claims, No Drawings

THERMOPLASTIC FILM LAMINATES

FIELDS OF THE INVENTION

This invention relates to thermoplastic packaging materials, particularly thermoplastic film laminates which may be formed into packages or which may be laminated to another film or film laminate to form a composite film which is formed into packages.

BACKGROUND OF THE INVENTION

A particularly useful class of shaped thermoplastic articles are those which are formed into sheets which are thermoformable so that cavities can be formed in the sheets to receive a product to be packaged. To close the package a sheet is laid over the filled cavity and sealed to the perimeter of the cavity.

In recent years the trend has been to produce thermoformable sheets which are laminates of several different polymeric materials in order to combine the desirable properties of each polymeric material into one film, for example, individual layers of materials having excellent strength or toughness, heat sealability, moisture and gas barriers, etc. are combined to form the final laminate. One way of producing such a laminate is to coextrude the polymeric layers so that they are melt joined within the coextrusion die and in many instances this is less costly and produces better bonding than producing the layers separately and then adhesively bonding them together. In other instances, it may be desirable to produce a film laminate in a coextrusion process which has many general usages including the capability to be adhesively laminated to another layer. Accordingly, one object of the present invention is to provide a coextruded film laminate which has excellent sealing properties and which can be laminated to another polymeric film or film laminate.

One of the problems often encountered in thermoplastic film laminates is that undesirable delamination occurs so that the layers or plies separate under certain conditions. Accordingly, it is another object of the present invention to provide a thermoplastic film laminate which is highly resistant to internal delamination, i.e., the layers of the laminate show superior layer-to-layer bonds within the laminate.

One class of polymeric materials, specifically the ionomer resins generally sold under the brand name of "Surlyn" have achieved widespread and general acceptance as excellent sealants and are also approved for usage in food packaging. However, the Surlyn brand materials are expensive and add significantly to the cost of thermoplastic laminates. Accordingly, another object of the present invention is to utilize the benefits of ionomeric resins but reduce the cost of the resulting laminate.

SUMMARY OF THE INVENTION

It has been surprisingly discovered that the objects mentioned above can be achieved by the thermoplastic film laminate of the present invention which comprises a first layer comprising an ethylene-vinyl acetate copolymer; a second layer comprising an ethylene-acrylic acid copolymer, said first layer being bonded to one surface of the second; and, a third layer comprising an ionomer, said third layer being bonded to the other surface of the second layer.

In another aspect, the subject invention is a process of making a thermoplastic film laminate which comprises the steps of providing a coextrusion die for coextruding at least three polymeric layers simultaneously; and, coextruding a layer of ethylene-acrylic acid copolymer between a layer of ethylene-vinyl acetate copolymer and an ionomer layer, said ethylene-acrylic acid copolymer layer being in surface contact with said other two layers thereby forming a three layer laminate.

PREFERRED EMBODIMENT

As used herein ethylene-vinyl acetate copolymer will be designated as "EVA"; ethylene-acrylic acid copolymer will be designated as "EAA"; the word "laminate" will refer to a thermoplastic film having more than one layer of polymeric material, i.e., more than one ply; a "composite" laminate will be a multi-layer film structure which is formed by adding at least one layer to a previously formed laminate; and, "ionomer" will generally mean the modified polymers containing carboxlic groups formed in the presence of metalic ions which are generally sold under the brand name "Surlyn" but do not necessarily have to be of that brand.

(A) Preferred Laminate

The preferred embodiment of the present invention, as referred to herein is a coextruded, three layer laminate having the following arrangment:

EVA/EAA/ionomer.

In the preferred embodiment the vinyl-acetate content of the EVA is 4% by weight and may be obtained from a number of commercial resin suppliers; the acrylic weight percentage in the EAA is preferred to be approximately 8% and a satisfactory resin is "Polyethylene-452" sold by Dow Chemical Company; and, a preferred ionomer is that sold as "Surlyn AD8231" by the duPont Company which is an ionomer with a zinc cation. This laminate is preferably formed by the coextrusion process described herein below but could be formed by any melt joining process such as extrusion coating.

In a 2.0 mil film, the preferred thickness ratio for the above structure is 70% EVA/15% EAA/15% ionomer. For films in the range of 2.5 to 5.0 mils in thickness, the preferred ratio is 76% EVA/12% EAA/12% ionomer.

In use, the laminate of the present invention can be a sealing substrate added to another film layer to form a composite laminate. The EVA surface is the laminating surface to which a polymeric layer such as nylon is laminated. The composite structure would then have the following arrangment:

nylon/EVA/EAA/ionomer.

This composite laminate forms an excellent covering web with the nylon on the outside for its strength and abuse and scratch resistance. The ionomer surface is a sealing surface which can be sealed around the perimeter of a cavity formed in another thermoplastic web which preferably has an ionomeric sealing surface. In prior art structures, for example, a 2.0 mil thickness of ionomer would be used but, in the preferred embodiment, 85% of the ionomer is replaced by substantially less expensive materials. The preferred embodiment will not internally delaminate in seal strength and bond strength tests which clearly demonstrate that it is equivalent to if not superior to a pure ionomer structure.

In the seal strength test, the composite laminate is sealed to itself, sealing surface to sealing surface, under pressure and at 305° F., then a one inch wide strip is cut out. Adjacent end portions of the two composite laminates were not sealed and each of these two adjacent ends were clamped in opposite jaws of an Instron testing apparatus. Thus, one Instron jaw held the end of the one inch wide composite laminate strip and the other held the end of the other composite laminate strip with the seal being disposed approximately halfway between the two jaws so that the direction of applied force was at right angles to the seal line between the two composite laminates. In each test one or the other of the composite laminates would rupture and break at a point away from the sealed area and no indication was found that there was any rupture or delamination in the seal area or within the laminate.

In the bond strength test again the composite laminate was sealed to itself, sealing surface to sealing surface, at 305° F., and a gripping portion was left at both ends of the sealed together surface. This time the composite laminate at one end of the sealed together strip was placed in an Instron jaw and the other composite laminate strip was placed in the oppposite Instron jaw so that the force applied was essentially parallel to the sealed together surfaces. Again, no delamination of the preferred laminate was observed in the test.

On a similar test as above using a pure ionomer film as the laminate substrate the seal strength was measurable as 7.0 lb/in and the bond strength was measured as 3.3 lb/in. Thus, the laminate of the present invention was shown to be superior to that of a pure ionomer laminate.

Using EAA as the adhesive layer between the laminating layer (EVA) and the sealing layer (ionomer) gives superior internal bonding. In another test, an ionomer designated as Surlyn 1650 (zinc cation) was used as the adhesive layer between the EVA layer and the sealing layer. The sealing layer was an ionomer designated as Surlyn 1601 (sodium cation). This laminate was prepared by coextrusion and subjected to bond and seal strength tests as described above. The seal strength was 4.6 lb/in and the bond strength value was 0.7 lb/in.

In investigating other coextruded substrates, alternate resins were evaluated on the basis of their ability to adhere to both EVA and ionomer, and irradiation of the substrate with ionizing radiation to induce crosslinking was explored as a method to increase the internal bonds of the laminate. In general, the resin used between the laminating layer (EVA) and the sealing layer (ionomer) was a higher vinyl-acetate content EVA copolymer. It was found in the test that irradiation did in fact increase the internal bond strength; but, the inconsistency of the bond strength was so great that a high confidence level could not be assigned to the results.

(B) Process for Producing the Film Laminate

The preferred process of the present invention which may be employed to produce the preferred laminate described above is a coextrusion process in which a coextrusion die is fed by three extruders to extrude the EAA layer between the EVA and ionomer layers. The extrusion die can be a slot die which coextrudes the materials as a flat sheet or, preferably, the die is a circular coextrusion die extrudes the materials as three concentric tubes which are melt joined within the die. Such coextrusion dies are well known in the art.

Preferred die diameters to produce the preferred laminate are diameters in the range of 11 to 14 inches. As the multi-walled tube emerges from the die it is still in a molten condition so that the tubing can be inflated to stretch it to a diameter in the range of 27 to 50 inches depending upon the final thickness of the laminate which is desired. This stretching will produce a final laminate thickness in the range of 2.0 to 5.0 mils. Satisfactory thicknesses can be as low as 0.5 mil and as high as 6.0 mils. Once the laminate has been stretched and cooled, the inflated bubble is flattened, the material is slit and then it is ready for use.

In making the film a vinyl-acetate content of 4% by weight in the EVA in the sealing layer is preferred but vinyl-acetate contents up to 12% and even 14% can be employed. For the sealing or ionomer layer, the ionomer designated Surlyn AD8231 having a zinc cation is preferred and other zinc cation resins are satisfactory.

The use of EAA as the adhesive layer between the sealing and laminating layers is an important feature of the present invention. The preferred EAA is one sold as Polyethylene-452 by Dow with a 8% nominal weight of acrylic acid. EAA copolymers having as low as 3.5% acrylic acid were tried as well as those having as high as 11% but processing problems were encountered with these copolymers, i.e., by processing problems it is meant that the laminate could not be coextruded and consistently blown into a bubble for stretching without ruptures or loss of control of the bubble. In addition, ethylene-methacrylic acid copolymers were used as well as ethylene-metha-acrylate and a satisfactory laminates were not produced with either of these as the adhesive layer.

EAA copolymer with 6 to 10% by weight of acrylic acid provides superior bonding between the EVA laminating layer and the ionomer sealing layer so that internal delamination is effectively eliminated.

Having thus described my invention, I claim:

1. A thermoplastic film laminate having improved delamination resistance comprising:
   (a) a first layer comprising an ethylene-vinyl acetate copolymer;
   (b) a second layer comprising an ethylene-acrylic acid copolymer, one surface of said first layer being bonded to one surface of the second layer;
   (c) a third layer comprising an ionomer, said third layer being bonded to the other surface of the second layer; and,
   (d) said first, second, and third layers being melt joined without adhesive therebetween.

2. The laminate of claim 1 wherein the total thickness of said laminate is in the range from 0.5 mils to 6.0 mils the thickness ratio of the first/second/third layers is approximately 70 to 76/15 to 12/15 to 12.

3. The laminate of claim 1 wherein vinyl acetate content of the ethylene-vinyl acetate copolymer is in the range of 4% to 14% by weight, the acrylic acid content of the ethylene-acrylic acid copolymer is in the range of 6 to 10% by weight, and the ionomer cation is zinc.

4. The laminate of claim 1 including at least one additional polymeric layer of nylon, said additional layer being bonded to the other surface of the first layer.

* * * * *